United States Patent
Hashemzadeh et al.

(10) Patent No.: US 6,231,921 B1
(45) Date of Patent: May 15, 2001

(54) USE OF POLYMER POWDER FOR PRODUCING BALLISTIC-RESISTANT FIBER MATERIALS

(75) Inventors: Abdulmajid Hashemzadeh, Burgkirchen; Klaus Kohlhammer, Marktl, both of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/397,631

(22) Filed: Sep. 15, 1999

(30) Foreign Application Priority Data

Sep. 17, 1998 (DE) ............................................. 198 42 661

(51) Int. Cl.$^7$ ............................... B05D 1/12; B05D 3/02; B05D 3/12
(52) U.S. Cl. .................... 427/180; 427/369; 427/370; 427/389.8; 427/389.9; 427/393.5; 428/375; 428/378; 428/379; 428/390; 428/391; 428/392; 428/395
(58) Field of Search ............................... 427/389.8, 389.9, 427/393.5, 180, 369, 370; 428/375, 378, 379, 390, 391, 392, 395

(56) References Cited

U.S. PATENT DOCUMENTS

| | | | |
|---|---|---|---|
| 4,748,064 | * | 5/1988 | Harpell et al. ........................ 428/113 |
| 4,916,000 | * | 4/1990 | Li et al. ................................ 428/105 |
| 5,977,244 | * | 11/1999 | Kohlhammer et al. .............. 427/389 |

FOREIGN PATENT DOCUMENTS

| | | |
|---|---|---|
| 29 27 653 | 1/1981 | (DE) . |
| 3426458 | 1/1986 | (DE) . |
| 3627485 | 2/1988 | (DE) . |
| 4236234 | 4/1994 | (DE) . |
| 19733133 | 2/1999 | (DE) . |
| 0 169 432 | 1/1986 | (EP) . |
| 0 597 165 | 5/1994 | (EP) . |
| 2077020 | * 4/1997 | (RU) . |
| 94/20661 | 9/1994 | (WO) . |

OTHER PUBLICATIONS

Derwent Abstract corresponding to EP 0 169 432 (AN 1986–030100), Jan. 1986.
Derwent Abstract corresponding to EP 0 597 165 (AN 1994–160293), May 1984.
Derwent Abstract corresponding to DE 29 27 653 (AN 1981–07879D), Jan. 1981.
Derwent Abstract corresponding to DE 3,627,485 [AN 1988–050718], Feb. 1988.
Derwent Abstract corresponding to DE, 4,236,234 [AN 1994–145407], Apr. 1994.
Derwent Abstract corresponding to DE 3,426,458 [AN 1986–030100], 1986.
Derwent Abstract corresponding to DE 1,973,3133 [AN 1999–108373], Feb. 1999.

* cited by examiner

Primary Examiner—Erma Cameron
(74) Attorney, Agent, or Firm—Burgess, Ryan & Wayne; Milton J. Wayne; William R. Moran

(57) ABSTRACT

The invention discloses a method of using crosslinkable polymer powders for producing ballistic-resistant fiber materials, which comprises consolidating the textile sheet materials by means of pulverulent crosslinkable copolymers which are based on ethylenically unsaturated monomers and have a glass transition temperature Tg or a melting point of $\geq 40°$ C. and a melt viscosity of $\geq 2000$ mPas.

11 Claims, 2 Drawing Sheets

Figure 1:
Figure 1 shows a fabric ply of the aramid fiber panel described in Inventive Example 1. The individual, freely movable aramid fibers are clearly visible.
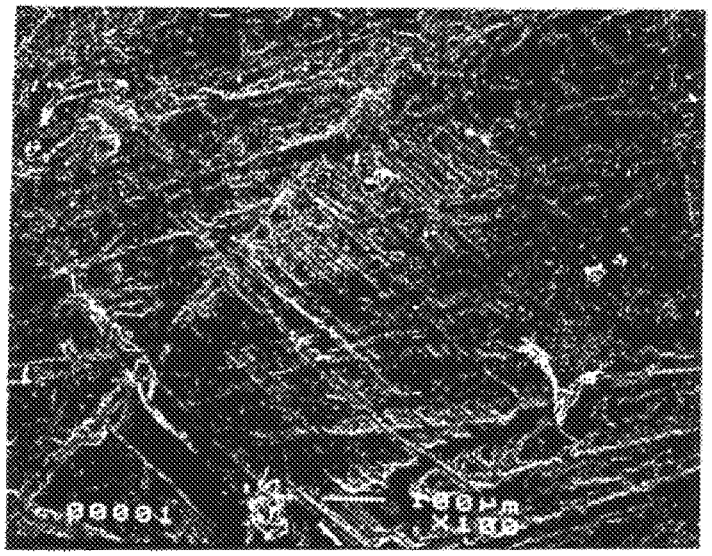
Figure 2: PRIOR ART
Figure 2 shows a fabric ply of the aramid fiber panel described in Comparative Example 2. It is clearly visible that the aramid fibers are completely surrounded by binder.

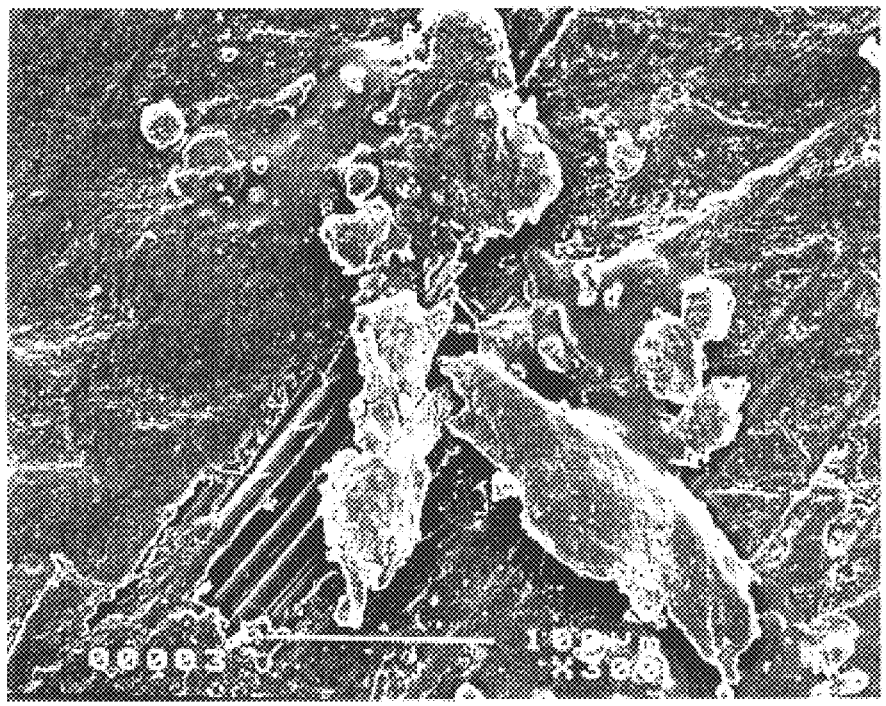
FIGURE 3: PRIOR ART

USE OF POLYMER POWDER FOR PRODUCING BALLISTIC-RESISTANT FIBER MATERIALS

BACKGROUND OF THE INVENTION

1. Field of the Invention

This invention relates to the use of cross-linkable polymer powders for producing ballistic-resistant fiber materials.

2. Background Art

It is known to produce protective armors by using materials based on textile sheet materials produced from aramid fibers. Examples are the armored vehicle floor coverings described in DE-A 3627485. Further examples are protective linings for motor vehicle doors described in DE-A 4236234. For the purposes mentioned, a plurality of plies of woven aramid fiber fabric are combined with polymeric binders to form multiply fabrics or rigid plates. In general, the individual fabric plies are saturated with binder solutions, for example phenolic resin solutions, for this purpose.

DE-A 3426458, however, discloses that this approach will wet through the aramid fibers which therefore have distinctly worse stopping power. This reference therefore proposes using crosslinkable thermoplastic polymers in high viscosity solution or dispersion or as a fusible fiber so as to avoid impregnating the fiber. Fusible fibers have the disadvantage of having to be mixed in before the fabrics which are to be consolidated are produced and of not providing rigid articles. The stopping power from binding with solutions or dispersions was unsatisfactory.

SUMMARY OF THE INVENTION

Against this background, it is an object of the present invention to provide ballistic-resistant fiber materials providing improved stopping power as compared with the prior art.

It has been determined, surprisingly, that higher ballistic resistances are obtained when crosslinkable thermoplastic polymers are applied in powder form to the aramid fibers.

The present invention accordingly provides for a method of using crosslinkable polymer powders for producing ballistic-resistant fiber materials, which comprises consolidating the textile sheet materials by means of pulverulent crosslinkable which are based on copolymers ethylenically unsaturated monomers and have a glass transition temperature Tg or a melting point of $\geq 40°$ C. and a melt viscosity of $\geq 200$ mPas.

BRIEF DESCRIPTION OF THE DRAWINGS

FIG. 1 shows a fabric ply of the aramid fiber panel described in Inventive Example 1. The individual, freely movable aramid fibers are clearly visible.

FIG. 2 shows a fabric ply of the aramid fiber panel described in Comparative Example 2, it is clearly visible that the aramid fibers are completely surrounded by binder.

FIG. 3. shows a fabric ply of the dispersion-bound aramid fiber panel described in Comparative Example 3. Again it is clearly visible that the aramid fibers are completely surrounded by binder.

DESCRIPTION OF THE PREFERRED EMBODIMENTS

Suitable are those based on one or more copolymers monomers selected from the group consisting of vinyl esters of branched or unbranched alkylcarboxylic acids having 1 to 15 carbon atoms; methacrylic esters and acrylic esters of alcohols having 1 to 15 carbon atoms; vinylaromatics such as styrene; olefins such as ethylene and butadiene and also vinyl chloride. Preferred vinyl esters are vinyl acetate, vinyl propionate, vinyl butyrate, vinyl 2-ethylhexanoate, vinyl It is clearly visible that the aramid fibers are completely surrounded by binder. laurate, 1-methylvinyl acetate, vinyl pivalate and vinyl esters of alpha-branched monocarboxylic acids of 9 to 11 carbon atoms, for example VeoVa9® or VeoVa10® (trade names of Shell). Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate.

For crosslinking, the additionally contain copolymers crosslinkable functional comonomers in a fraction of 0.01 to 25% by weight, preferably 01 to 15% by weight, especially 0.2 to 6.0% by weight, based on the total weight of the interpolymer.

Examples of suitable comonomers are those which lead to self-crosslinking polymers: condensable comonomers units from the group of the N-methylol(meth)acrylamides and their N-(alkoxymethyl) and (N-acyloxymethyl) derivatives, or from the group of the gamma-acryloyl- and gamma-methacryloyl-oxypropyl-trialkoxysilanes and vinyltrialkoxysilanes. Preferred N-methylol(meth)acrylamides and their N-(alkoxymethyl) and (N-acyloxymethyl) derivatives are N-methylol-acrylamide, N-methylolmethacrylamide, N-(isobutoxy-methyl)acrylamide, N-(n-butoxymethyl) acrylamide. Preferred silane-containing comonomer units are vinyltriethoxysilane, gamma-methacryloyloxypropyltriethoxysilane and trisacetoxyvinylsilane.

Also suitable are functional comonomers which are crosslinked by means of an external crosslinker. For example, ethylenically unsaturated carboxyl- containing comonomers from the group of the ethylenically unsaturated mono- and dicarboxylic acids such as acrylic acid, methacrylic acid, maleic acid, fumaric acid, itaconic acid and crotonic acid. The carboxyl-functional copolymers can be crosslinked with epoxy-functional crosslinkers. Further examples are ethylenically unsaturated hydroxyl-containing comonomers from the group of the hydroxyalkyl acrylates and hydroxyalkyl methacrylates such as hydroxyethyl acrylate, hydroxyethyl methacrylate, hydroxypropyl acrylate and hydroxypropyl methacrylate. The hydroxy- functional copolymers can be crosslinked with isocyanate-functional crosslinkers. Preferred are vinyl acetate/vinyl chloride, copolymers vinyl acetate/VeoVa9®-, methyl methacrylate/butyl acrylate, styrene/butadiene and styrene/butyl acrylate, styrene/butadiene and styrene/butyl acrylate copolymers which each contain 0.01 to 25% by weight of one or more monomer units selected from the group consisting of N-methylolacrylamide, N-methylolmethacrylamide, N-(isobutoxymethyl) acrylamide, N-(n-butoxymethyl)-acrylamide, vinyltriethoxysilane, gamma-methacryloyloxypropyltriethoxysilane, trisacetoxyvinylsilane, acrylic acid, methacrylic acid, maleic acid, fumaric acid, itaconic acid, crotonic acid, hydroxyethyl acrylate, hydroxyethyl methacrylate, hydroxypropyl acrylate, and their composition is chosen so as to produce the above-mentioned glass transition temperatures Tg or melting points.

Preference is given to glass transition temperatures of 60° C., the glass transition temperature being determinable by means of differential scanning calorimetry (DSC) or predictable by means of the Fox equation. The preferred melt viscosity is 2000 to 3000 mPas, the melt viscosities being determined at 160 °C. in each case.

Suitable external crosslinkers are compounds having two or more epoxide or isocyanate groups. Examples of suitable epoxide crosslinkers are those of the bisphenol A type, i.e., condensation products of bisphenol A and epichlorohydrin or methylepichlorohydrin. Such epoxide crosslinkers are commercially available, for example under the trade names of Epicote or Eurepox. Suitable diisocyanates are likewise common commercial products, for example m-tetramethylxylene diisocyanate (TMXDI), methylenediphenyl diisocyanate (MDI). The crosslinker content is generally 0.1 to 25% by weight, preferably 4 to 12% by weight, based on the pulverulent interpolymer.

Particular preference is given to using vinyl acetate/vinyl chloride, vinyl acetate/VeoVa9®-, methyl methacrylate/butyl acrylate, styrene/butadiene and styrene/butyl acrylate which each contain 0.01 copolymers to 25% by weight of one or more monomer units selected from the group consisting of acrylic acid, methacrylic acid, maleic acid, fumaric acid, itaconic acid, crotonic acid, hydroxyethyl acrylate, hydroxyethyl methacrylate, hydroxypropyl acrylate are used together with epoxide crosslinkers of the bisphenol A type.

The crosslinking can be, for example, speeded up by means of catalysts derived from triphenylphosphonium halides or quaternary ammonium compounds. The compounds mentioned are commercially available and are preferably used in amounts of 0.1 to 5% by weight, based on the pulverulent copolymer The crosslinkable and the crosslinkable copolymers powder mixture are prepared in a conventional manner, generally by means of emulsion polymerization, if necessary with admixture of the external crosslinker and, if desired, of the crosslinking catalyst, and subsequent drying of the polymer dispersion obtained. In another embodiment for preparing the crosslinkable powder mixture, and copolymer is prepared by means of an aqueous emulsion polymerization, dried in a conventional manner to form a powder and, if necessary, the external crosslinker is mixed in. For example as described in DE-A 19733133 and WO-A 94/20661, whose disclosures in this respect are incorporated herein.

For fiber bonding, the powder is generally used in an amount of 5 to 200 g/m$^2$, preferably 5 to 100 g/m$^2$, but in particular 10 to 50 g/m$^2$, and the sheet materials are consolidated at a temperature of 100° C. to 250° C. with or without pressure, in general from 0.5 to 20 bar. Suitable fibers for producing ballistic-resistant materials are known to those skilled in the art. In general, polyamide fibers, preferably aromatic polyamide fibers such as aramid fibers, are used. However, it is also possible to use fiber blends comprising carbon fibers, glass fibers and also aramid fibers. The fibers can be used in the form of woven textiles or in the form of non-wovens such as scrims or knits. The non-wovens can optionally be mechanically preconsolidated, for example needled.

The fibrous structures may be prepared by mixing the fibers with the powder and spreading out the mixture of fiber and powder prior to consolidation. Prior to consolidation, the fibers may also be spread out in sheet form and then the pulverulent binder sprinkled into the spread-out fiber material. The fiber material is subsequently bonded using temperature with or without pressure. In a possible embodiment, the fibrous structures may be treated with water or steam after mixing with the powder or after the powder has been sprinkled in, Ballistic-resistant materials are generally produced by bonding together a plurality of plies, optionally up to 30 plies, of the powder-consolidated or woven fibrous structure. Lamination may be effected by laminating powder-prebound fibrous structures together by treatment at elevated temperatures with or without elevated pressure. It is also possible for a plurality of plies of woven fabric to be bonded together by sprinkling pulverulent binder between the fabric plies and then carrying out a heat treatment with or without a pressure treatment. However, the laminating process can also be used to produce composite panels of the powder binder-consolidated fibrous structures or wovens with steel panels or ceramic panels.

The ballistic-resistant fiber materials thus obtainable are useful for producing protective mats or for producing shaped articles for the internal and external armoring of land-, air- and seacraft. Further possible applications are the production of protective armors and protective helmets for personal protection.

The following examples illustrate the invention.

Inventive Example 1:

A pulverulent binder mixture of 98% by weight of a styrene-butyl acrylate interpolymer having an acrylic acid fraction of 5% (Tg=60° C.; melt viscosity>2000 mPas) and 5% by weight of epoxide crosslinker, based on is copolymer applied by means of an electrostatic powder gun in an amount of 30 g/m$^2$ to 12 plies of a woven aramid fiber fabric (twill construction) measuring 30 mm×30 mm. The fabrics thus treated were treated at 170° C. for 2 minutes to sinter the powder to the fiber. The 12 plies were then stacked on top of each other and pressed together at 180° C. and a pressure of 1 bar. The result was a rigid aramid panel about 6 mm in thickness.

Comparative Example 2:

12 plies of a woven aramid fiber fabric (twill construction) measuring 30 mm×30 mm were each saturated with a phenol-formaldehyde resin solution (Bakelite-Harz 9708 TP, from Bakelite AG) in an amount of 30 g/m$^2$. The impregnated fabrics were then placed on top of one another and pressed together at a temperature of 180° C. and a pressure of 1 bar. This likewise resulted in a rigid aramid panel about 6 mm in thickness.

Comparative Example 3:

12 plies of a woven aramid fiber fabric (twill construction) measuring 30 mm×30 mm were each coated with a 50% strength aqueous dispersion of a styrene-butyl acrylate having an acrylic acid fraction of 5% and 5% by copolymer weight of epoxide crosslinker in an amount of 30 g/m$^2$. The coated fabrics were then placed atop of one another and pressed together at a temperature of 180° C. and a pressure of 1 bar. This likewise resulted in a rigid aramid panel about 6 mm in thickness.

Ballistic Resistance Tests

Ballistic resistance was tested by shooting soft nose projectiles at the laminates from a distance of 10 m. While the laminate of Inventive Example 1 resisted the projectiles and did not allow any to penetrate, all the projectiles penetrated through the laminates of Comparative Examples 2 and 3.

Samples of the panels according to Inventive Example 1 and Comparative Examples 2 and 3 were examined under the scanning electron microscope. FIG. 1 shows the panel of Inventive Example 1 with binder particles distributed in non-uniform fashion across the fiber. FIGS. 2 and 3 show the panels of Comparative Examples 2 and 3 with fibers completely surrounded by binder.

What is claimed is:

1. A method of using crosslinkable polymer powders for producing ballistic-resistant fiber material selected from the group consisting of aramid fibers, carbon fibers, glass fibers and fiber blends comprising aramid fibers, which comprises consolidating the fiber materials in the form of textile sheets by means of pulverulent crosslinkable copolymers which are based on ethylenically unsaturated monomers having a glass transition temperature Tg or a melting point of $\geq 40°$ C. and a melt viscosity of $\geq 2000$ mPas, said copolymers being based on at least one monomer selected from the group consisting of vinyl esters of branched or unbranched alkylcarboxylic acids having 1 to 15 carbon atoms, methacrylic esters and acrylic esters of alcohols having 1 to 15 carbon atoms, vinylaromatics, and olefins, each copolymer containing 0.01 to 25% by weight, based on the total weight of the copolymers of crosslinkable functional comonomers.

2. The method of claim 1, wherein the crosslinkable contain functional comonomers selected from the copolymers group consisting of N-methylol(meth)acrylamides and their N-(alkoxymethyl) and (N-acyloxymethyl) derivatives, gamma-acryloyl-and gamma-methacryloyl-oxypropyltrialkoxysilanes, vinyltrialkoxysilanes or ethylenically unsaturated carboxyl-containing comonomers, hydroxyl-containing comonomers selected from the group consisting of the hydroxyalkyl acrylates and the hydroxylalkyl methacrylates.

3. The method of claim 1, wherein the esters are selected from the group consisting of vinyl acetate/vinyl chloride, vinyl acetate/vinyl ester of a branched monocarboxylic acid having 9 carbon atoms, methyl methacrylate/butyl acrylate, styrene/butadiene and styrene/butyl acrylate which each contain 0.01 to 25% by weight of at least one monomer unit selected from the group consisting of acrylic acid, methacrylic acid, maleic acid, fumaric acid, itaconic acid, crotonic acid, hydroxyethyl acrylate, hydroxyethyl methacrylate, hydroxypropyl acrylate, which esters are used together with epoxide crosslinkers of the bisphenol A type.

4. The method of claim 1, wherein the powders are used in an amount of 5 to 50 $g/m^2$, based on the fiber weight, and the sheet materials are consolidated at a temperature of 100° C. to 250° C. with or without pressure, from 0.5 to 20 bar.

5. The method of claim 1, wherein the fibers are used in the form of woven textiles or in the form of nonwovens.

6. The method of claim 5, wherein the non-wovens are in the form of scrims or knits.

7. The method of claim 1, wherein the ballistic-resistant fiber materials are used for producing protective mats or for producing shaped articles for the internal and external armoring of land-, air- and seacraft.

8. The method of claim 1, wherein the ballistic-resistant fiber materials are used for producing protective armors and protective helmets for personal protection.

9. A ballistic-resistant fiber material prepared by the process of claim 1.

10. The ballistic-resistant fiber material of claim 9 which is in the form of a protective mat.

11. The ballistic-resistant fiber material of claim 9 which is in the form of protective armors and helmets.

* * * * *